US010425853B2

(12) United States Patent
Ratasuk et al.

(10) Patent No.: US 10,425,853 B2
(45) Date of Patent: Sep. 24, 2019

(54) METHOD FOR SCHEDULING OVERLAPPING RESOURCES FOR NARROWBAND INTERNET-OF-THINGS

(71) Applicant: Nokia Solutions and Networks Oy, Espoo (FI)

(72) Inventors: Rapeepat Ratasuk, Hoffman Estates, IL (US); Ryan Keating, Chicago, IL (US); Nitin Mangalvedhe, Hoffman Estates, IL (US); Tzu-Chung (Frank) Hsieh, Hoffman Estates, IL (US); Jun Tan, Lake Zurich, IL (US); Jie Chen, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 94 days.

(21) Appl. No.: 15/444,869

(22) Filed: Feb. 28, 2017

(65) Prior Publication Data
US 2018/0249358 A1    Aug. 30, 2018

(51) Int. Cl.
*H04W 24/10* (2009.01)
*H04W 72/08* (2009.01)
(Continued)

(52) U.S. Cl.
CPC ............ *H04W 24/10* (2013.01); *H04L 5/001* (2013.01); *H04L 43/16* (2013.01);
(Continued)

(58) Field of Classification Search
CPC . H04W 24/10; H04W 72/121; H04W 72/085; H04W 72/1284; H04L 43/16; H04L 5/001
See application file for complete search history.

(56) References Cited

U.S. PATENT DOCUMENTS

2015/0312074 A1   10/2015   Zhu et al.
2016/0088646 A1   3/2016   Sun et al.
(Continued)

FOREIGN PATENT DOCUMENTS

WO    WO 2016188312 A1    12/2016

OTHER PUBLICATIONS

R1-167445; China Telecom; Classification of candidate UL non-orthogonal MA schemes; 3GPP TSG RAN WG1 Meetings #86; Gothenburg, Sweden, Aug. 22-26, 2016.
(Continued)

*Primary Examiner* — Min Jung
(74) *Attorney, Agent, or Firm* — Harrington & Smith (57) ABSTRACT

A method, apparatus, and computer program product are described that receive an indication of power levels at the base station in a wireless communications system from each user equipment of user equipments served by the base station and determine whether at least one user equipment of those user equipments is capable to overlap at least one same time-frequency resource as at least one user equipment of a remainder of those user equipments. In response to the determination that at least one user equipment is capable to overlap with at least one user equipment of the remainder, then such overlap is scheduled. Based on the overlap being scheduled, packets from the one or more user equipments received are then decoded using an advanced receiver process.

20 Claims, 8 Drawing Sheets

(51) Int. Cl.
  *H04L 12/26* (2006.01)
  *H04L 5/00* (2006.01)
  *H04W 72/12* (2009.01)
  *H04W 88/02* (2009.01)
(52) U.S. Cl.
  CPC ....... *H04W 72/085* (2013.01); *H04W 72/121* (2013.01); *H04W 72/1284* (2013.01); *H04W 88/02* (2013.01)

(56) References Cited

U.S. PATENT DOCUMENTS

| | | | |
|---|---|---|---|
| 2016/0278070 A1* | 9/2016 | Patel | H04L 5/0007 |
| 2016/0353424 A1* | 12/2016 | Stirling-Gallacher | H04B 7/0626 |
| 2017/0013391 A1 | 1/2017 | Rico Alvarino et al. | |
| 2017/0303302 A1* | 10/2017 | Bagheri | H04W 72/1257 |
| 2018/0270798 A1* | 9/2018 | Park | H04W 72/042 |
| 2018/0270800 A1* | 9/2018 | Park | H04W 72/042 |
| 2018/0278454 A1* | 9/2018 | Islam | H04L 1/0038 |
| 2018/0279363 A1* | 9/2018 | Su | H04W 74/085 |

OTHER PUBLICATIONS

R1-165416; Nokia et al; Overview of the proposed non-orthogonal MA schemes; 3GPP TSG-RAN W1 #85; Nanjing, P.R. China, May 23-27, 2016.

Rapeepat Ratasuk et al; Overview of Narrowband IoT in LTE Rel-13; 2016 IEEE Conference on Standards for Communications and Networking (CSCN).

Kenichi Higuchi et al; Non-orthogonal Multiple Access (NOMA) with Successive Interference Cancellation for Future Radio Access; IEICE Trans. Communication, Mar. 2015.

Linglong Dai et al; Non-Orthogonal Multiple Access for 5G: Solutions, Challenges, Opportunities, and Future Research Trends; IEEE Communications Magazine; Sep. 2015.

Intel Corporation R1-1610374, Support of link adaptation for UL grant-free NOMA schemes; 2016.

NTT DOCOMO R1-154535, Candidate non-orthogonal multiplexing access scheme; 2015.

* cited by examiner

METHOD FOR SCHEDULING OVERLAPPING RESOURCES FOR NARROWBAND INTERNET-OF-THINGS

TECHNICAL FIELD

This invention relates generally to wireless communication systems and, more specifically, relates to scheduling overlapping resources for narrowband Internet-of-Things.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The deployment of Internet of Things (IoT), consisting of devices of various types interconnected for communication, is expected to reach a massive scale in the next few years and wireless connectivity through wide-area networks will be an important component of this future. In 2015, an estimated 0.4 billion IoT devices are connected using cellular networks. This number will grow to 1.5 billion in 2021, equivalent to a yearly growth rate of 27%. In LTE Rel-13 narrowband IoT (NB-IoT) was introduced as a feature to support this expected growth in devices.

NarrowBand IoT (NB-IoT) is a Low Power Wide Area Network (LPWAN) radio technology standard that has been developed to enable a wide range of devices and services to be connected using cellular telecommunications bands. NB-IoT is a narrowband radio technology designed for the Internet of Things (IoT), and is one of a range of Mobile IoT (MIoT) technologies standardized by the 3rd Generation Partnership Project (3GPP).

NB-IoT is designed to have low complexity devices, low-throughput, low-cost, long battery life, and enabling a large number of connected devices. The NB-IoT technology can either be deployed in spectrum allocated to Long Term Evolution (LTE)—"in-band" utilizing resource blocks within a normal LTE carrier, or in the unused resource blocks within a LTE carrier's guard-band—or "standalone" for deployments in dedicated spectrum. It is also suitable for the re-farming of GSM spectrum. Additionally it is designed to have increased coverage capability corresponding to a maximum coupling loss (MCL) of up to 164 dB.

In IoT, a typical traffic profile is for mobile autonomous reporting where a UE will wake up, transmit data, then go back to sleep. Thus, this type of traffic is mostly on the uplink.

Figure 1:
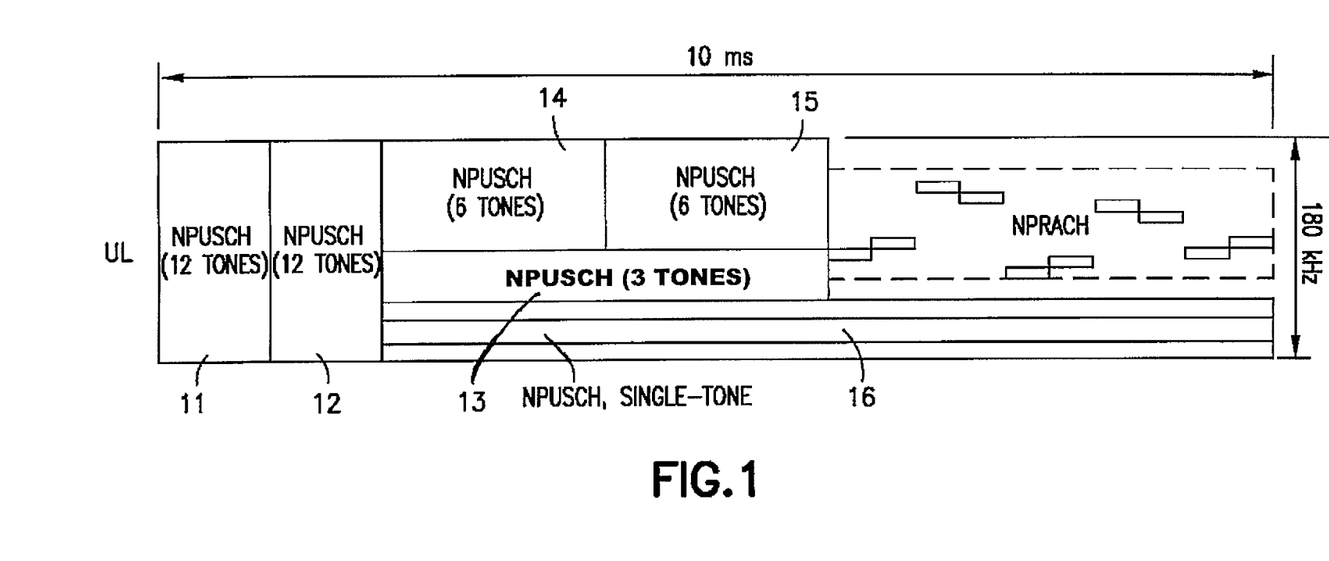
FIG. 1 is a block diagram of uplink channel structure for NB-IoT.

FIG. 1 shows the uplink channel structure for NB-IoT which consists of NPUSCH and NPRACH channels. Block 11 represents an NPUSCH of 12 tones as does block 12. Block 13 represents an NPUSCH of 3 tones. Blocks 14 and 15 each represent NPUSCH of 6 tones, while block 16 represents a single-tone NPUSCH.

To address the massive connectivity problem non-orthogonal multiple access (NOMA) on the uplink has been proposed. Traditionally, when users are scheduled in cellular networks, it is done in an orthogonal setting such that users are multiplexed in the time, space, frequency, or code domain in order to minimize interference between users. However, with the explosion in the number of devices desiring access to the network these multiplexing techniques begin to fall short.

NOMA allows users to overload the same resources and then uses multiuser receiver (MUR) techniques in order to decode all the users which share the same resources. There have been many proposals for how to realize NOMA including power domain non-orthogonal multiple access (PD-NOMA), interleave division multiple access (IDMA), and sparse coded multiple access (SCMA).

PD-NOMA takes advantage of users having different received power levels, either through power control or naturally occurring in the network, in order to separate the users. PD-NOMA is used with successive interference cancellation (SIC) in order to cancel higher power signals, which are decoded first, before decoding the other users. SIC allows signals which share either exact same or partial resources to be canceled out from one another if there is a sufficient power difference.

Figure 2:
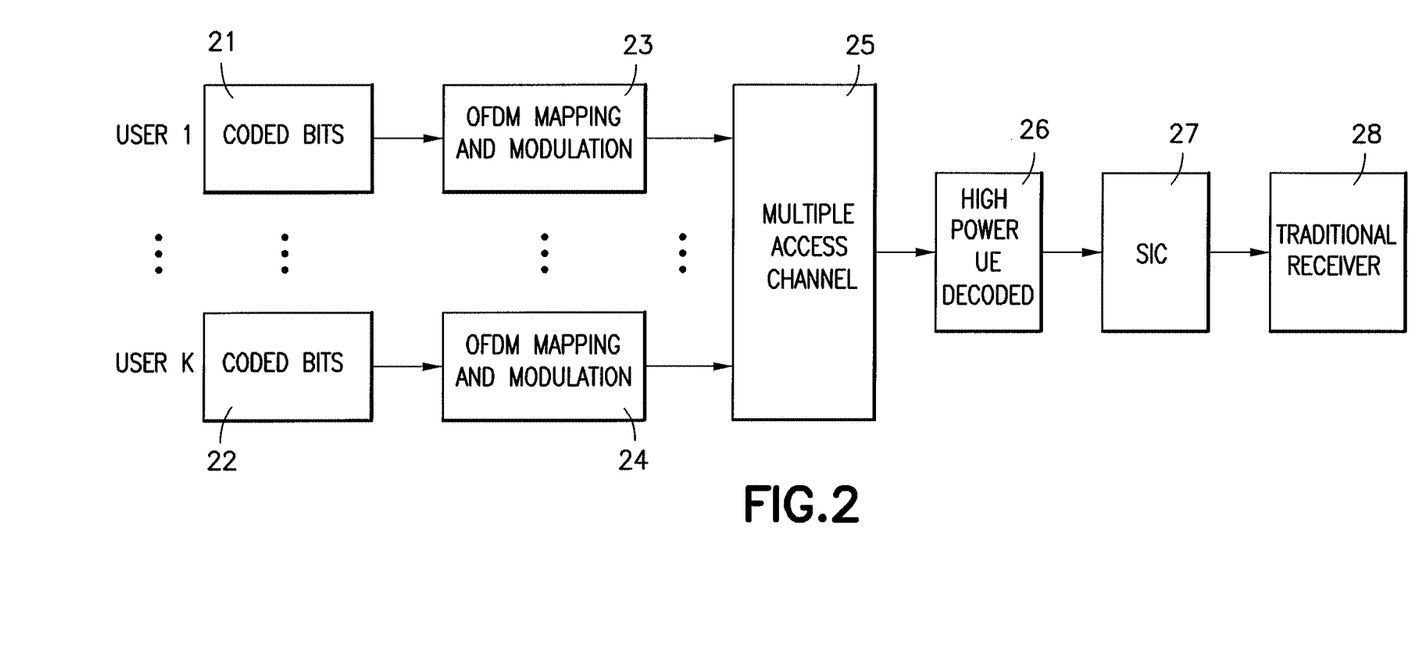
FIG. 2 is a block diagram of PD-NOMA as an example of an uplink (UL) NOMA system.

FIG. 2 shows a block diagram of PD-NOMA as an example of an uplink (UL) NOMA system. Block 21 represents the coded bits for user 1 which are resolved by OFDM mapping and modulation in block 23. Likewise, block 22 represents the coded bits for user K which are resolved by OFDM mapping and modulation in block 24. The results of blocks 23 and 24 are passed through the multiple access channel represented by block 25. From there the high-power UE is decoded in block 26 and with successive interference cancellation shown by block 27 sent to a traditional receiver shown by block 28.

The current invention moves beyond these techniques for scheduling overlapping resources for NB-IoT.

The following abbreviations that may be found in the specification and/or the drawing figures are defined as follows:

[2] 3GPP: 3rd generation project partner
[3] BLER block error rate
[4] CE coverage enhancement
[5] CRS cell reference signal
[6] DCI: Downlink control information
[7] DL: Downlink
[8] eNB evolved Node B (e.g., an LTE base station)
[9] I/F interface
[10] IoT Internet of Things
[11] LTE long term evolution
[12] MCS Modulation and coding scheme
[13] MTC machine type communication
[14] MME mobility management entity
[15] mMTC massive MTC
[16] NB-IoT Narrow band IoT (internet of things)
[17] NCE network control element
[18] NPDCCH: Narrow band PDCCH
[19] NPDSCH: Narrow band PDSCH
[20] NPRACH: Narrow band PRACH
[21] NRS NB-RS (NB-IoT reference signal)
[22] NRSRP NB-IoT RSRP
[23] N/W network
[24] PRB: Physical resource block
[25] PDCCH: Physical downlink control channel
[26] PDSCH: Physical downlink sharing channel
[27] PRACH physical random access channel
[28] RRC: Radio resource control
[29] RLF radio link failure
[30] RLM radio link monitoring
[31] RRH remote radio head
[32] RSRP Reference Signal Received Power
[33] Rx receiver

[34] SGW serving gateway
[35] SNR signal to noise ratio
[36] Tx transmitter
[37] UE user equipment (e.g., a wireless, typically mobile device)
[38] UL: Uplink

BRIEF SUMMARY

This section is intended to include examples and is not intended to be limiting.

Considering the large capacity requirements for wireless networks supporting IoT, it is critical to have more efficient and effective methods to support these features. This invention involves innovative methods for scheduling overlapping resources for narrowband Internet-of-Things equipment in wireless systems.

An example of an embodiment, is a method that comprises receiving an indication of power levels at the base station in a wireless communications system from each UE of one or more UEs served by the base station; determining whether at least one UE of one or more UEs is capable to overlap at least one same time-frequency resource as at least one UE of a remainder of one or more UEs; in response to the determining permitting the overlap by at least one UE capable to overlap with at least one UE of the remainder, scheduling the overlap; based on the scheduling overlap, receiving packets from the one or more UEs served by the base station; and decoding the packets from the one or more UEs using an advanced receiver process.

An example of another embodiment of the present invention, is an apparatus comprising at least one processor; and at least one memory including computer program code, the at least one memory and the computer program code configured to, with the at least one processor, cause the apparatus to perform at least the following receiving an indication of power levels in a wireless communications system from each UE of one or more UEs served by the base station; determining whether at least one UE of one or more UEs is capable to overlap at least one same time-frequency resource as at least one UE of a remainder of one or more UEs; in response to the determining permitting the overlap by at least one UE capable to overlap with at least one UE of the remainder, scheduling the overlap; based on the scheduling overlap, receiving packets from the one or more UEs served by the apparatus; and decoding the packets from the one or more UEs using an advanced receiver process.

An example of a further embodiment of the present invention, is an apparatus comprising means to receive an indication of power levels in a wireless communications system from each UE of one or more UEs served by the base station; means to determine whether at least one UE of one or more UEs is capable to overlap at least one same time-frequency resource as at least one UE of a remainder of one or more UEs; in response to the determination permitting the overlap by at least one UE capable to overlap with at least one UE of the remainder, means to schedule the overlap; based on the scheduling overlap, means to receive packets from the one or more UEs served by the apparatus; and means to decode the packets from the one or more UEs using an advanced receiver process.

In yet another example of an embodiment of the current invention, a computer program product embodied on a non-transitory computer-readable medium in which a computer program is stored that, when being executed by a computer, would be configured to provide instructions to control or carry out receiving an indication of power levels at the base station in a wireless communications system from each UE of one or more UEs served by the base station; determining whether at least one UE of one or more UEs is capable to overlap at least one same time-frequency resource as at least one UE of a remainder of one or more UEs; in response to the determining permitting the overlap by at least one UE capable to overlap with at least one UE of the remainder, scheduling the overlap; based on the scheduling overlap, receiving packets from the one or more UEs served by the base station; and decoding the packets from the one or more UEs using an advanced receiver process.

DETAILED DESCRIPTION OF THE DRAWINGS

The exemplary embodiments herein describe techniques for scheduling overlapping resources for NB-IoT. Additional description of these techniques is presented after a system into which the exemplary embodiments may be used is described.

Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Our simulation results show that if there is sufficient power difference between the received signals then the performance of the lower power UEs is almost unaffected by the presence of the higher power UE. Three UEs were multiplexed onto the same resource blocks and one UE is allowed to have a 12 dB higher received power level at the eNB while the other two UEs are using MU-MIMO techniques to decode.

Figure 3:
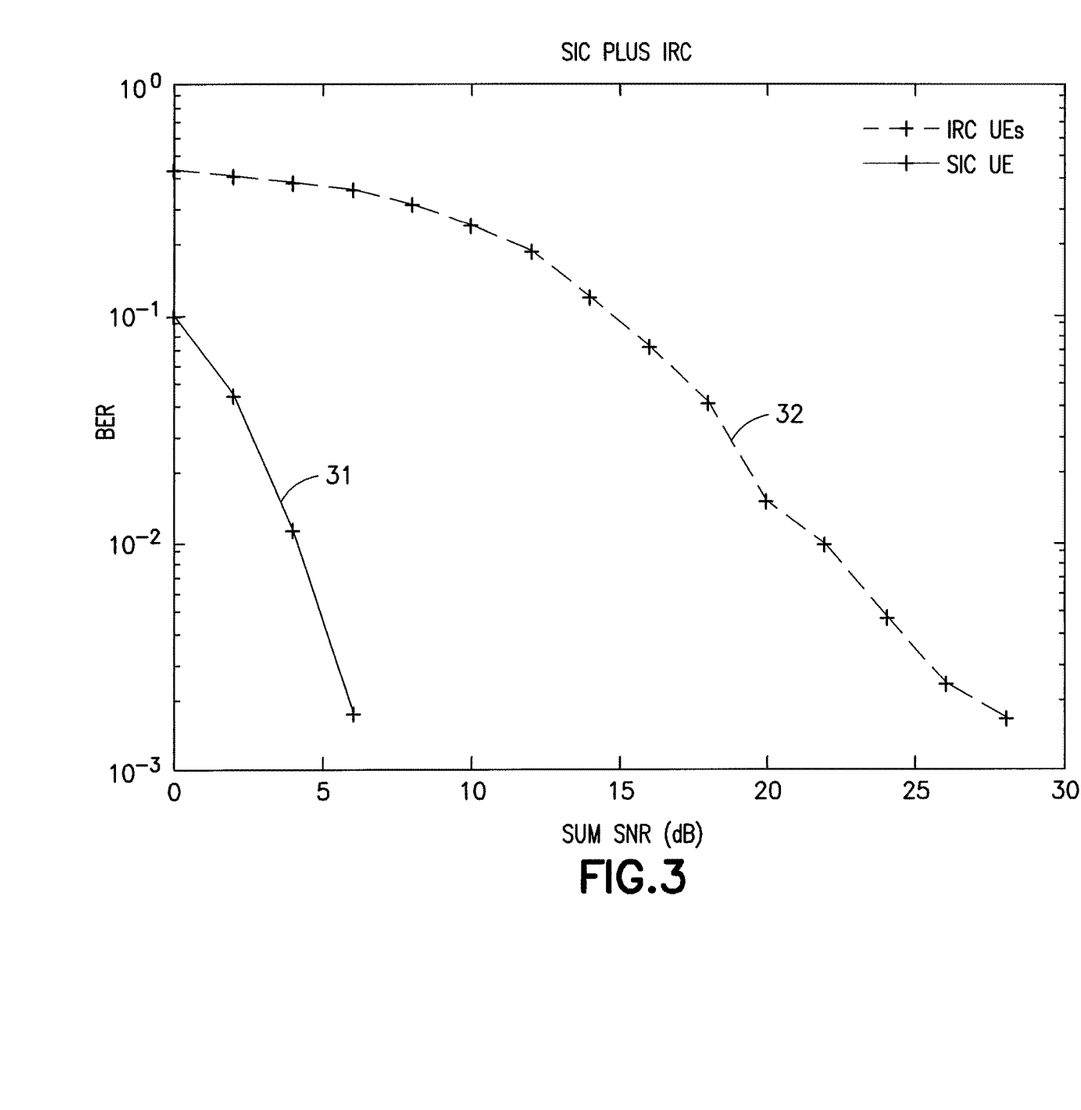
FIG. 3 is graph of the inventors' simulation results of PD-NOMA.

FIG. 3 shows the results for this scenario where curve 31 shows the BER of the higher power UE (which is canceled via SIC after decoding) and curve 32 shows the average BER of the other two UEs which use interference rejection combining.

In NB-IoT, a UE can be allocated 1, 3, 6, or 12 subcarriers out of the available 12 subcarriers in the PRB. UEs in poor coverage will be allocated 1 subcarrier to maximize their SNR (by concentrating all their transmission on a single carrier) as well as to minimize their overhead. Due to their poor coverage, these UEs will be transmitting for a long time.

For example, a UE in very poor condition (e.g. MCL of 164 dB) will need to transmit for 2560 ms to send a packet of size 680 bits at 10% BLER. On the other hand, UE in good condition will only need 4 ms to transmit the same packet using 12 subcarriers. This long transmission time by a UE in poor condition will block UEs in good conditions from being able to transmit using all 12 subcarriers. As a result, UEs in good radio condition can only use 6 subcarriers in order to avoid the single subcarrier used by the UE in poor coverage, they will reduce their throughput by half or more.

To alleviate this problem and to allow half-duplex NB-IoT UE to perform downlink time-frequency tracking, NB-IoT introduced a scheduling gap where a UE can only transmit continuously for 256 ms before having to stop for 40 ms. However, this gap only alleviates the problem of blocking and provides scheduling opportunities every 256 ms. Therefore, a method is needed to allow the eNB to more efficiently schedule UE in good condition at the same time as UE in poor condition.

Our invention uses the principles of non-orthogonal multiple access and interference mitigation technique using outlier detection and erasures.

An eNB determines whether it can schedule $UE_k$ (or multiple UEs), where k is an integer representing from zero to the maximum number of UEs requiring scheduling by the eNB, to overlap the same time-frequency resource as one or more other UEs. The determination is based on the difference in received power levels at the eNB between the UEs and on the expected performance and repetition factor configured for the overlapped UEs.

Regarding the difference in received power levels at the eNB between the UEs, the UEs shall report their corresponding downlink RSRP/RSRQ measurements. This reporting will allow power-domain non-orthogonal access techniques to be used. Similarly, received power levels can be determined from the UE's pathloss or power headroom. Note that for NB-IoT there is a natural separation in received power levels for UEs in normal coverage and enhanced coverage even with power control. So, alternatively, this criterion can also be based on UE's coverage level. In addition, UEs in different coverage levels will use different NPRACH configurations to access the cell. Therefore, the selected NPRACH configuration can also be used to differentiate a UE's coverage or received power level.

Regarding the expected performance and repetition factor configured for the overlapped UEs, namely, UE(s) with lower received power levels, in NB-IoT, the possible repetition factor is typically a power of two (for instance 2, 4, 8, 16, 32, 64, 128). Thus, if the eNB determines that a UE needs repetition factor of 80, it will select the next largest supported repetition factor, namely, 128. The fact that the UE transmits more repetitions than required for desired performance provides some margin for eNB to introduce intentional interference to overlapped UEs without meaningfully impacting its overall throughput.

Figure 4:
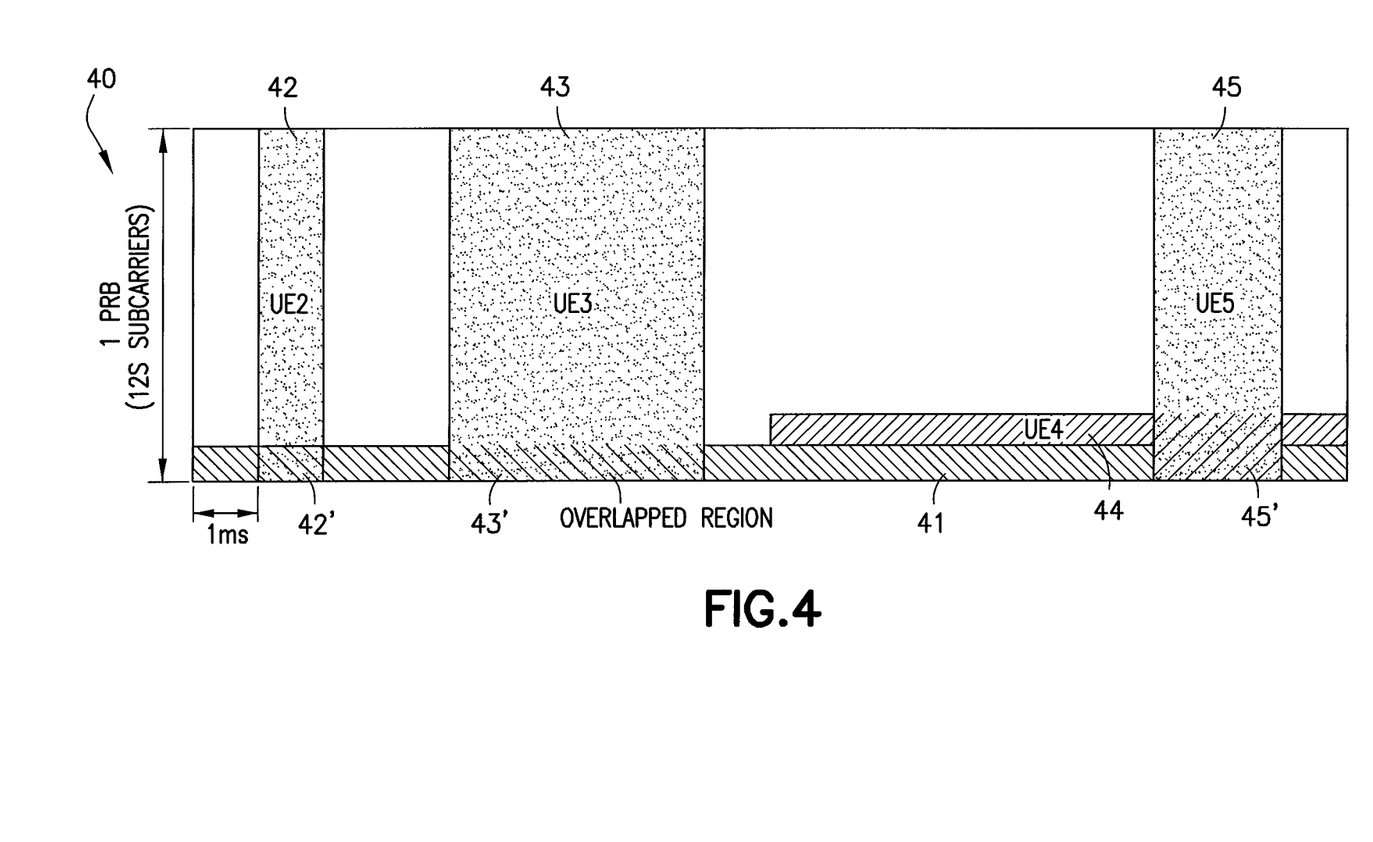
FIG. 4 is a diagram representing scheduling of UEs in good condition to overlap with UEs in poor condition.

If the UE power difference determination is successful, the eNB schedules a UE (or UEs) in good condition to overlap the same time-frequency resource as one or more other UEs. This is shown in FIG. 4 depicting in block 40 one physical resource block of 12 subcarriers, where $UE_2$ (block 42) overlaps with $UE_1$ (block 41) at block 42', where $UE_3$ (block 43) overlaps with $UE_1$ (block 41) at block 43', and where $UE_5$ (block 45) overlaps with $UE_1$ (block 41) and $UE_4$ (block 44) at block 45'.

The eNB can only schedule UE(s) with sufficiently different received power levels to overlap with an ongoing transmission. For example, if received power level for $UE_1$ is $P_1$ (dBm), then the eNB can only schedule another UE to partially overlap with the transmission of $UE_1$ if its received power level is greater than $P_1+T$, where T is a threshold (for example, 5 dB, 10 dB).

In another embodiment, the eNB schedules $UE_1$ and $UE_2$ in partially overlapping resources if the signal-to-interference-plus noise ratio (SINR) is estimated to be degraded due to mutual interference by no more than $T_1$ dB for $UE_1$ and/or $T_2$ dB for $UE_2$, where $T_1$ and $T_2$ are thresholds determined by the eNB based on UE coverage level, number of repetitions, modulation and coding scheme (MCS), power level, or other parameters.

In another embodiment, the eNB can only schedule a UE to overlap with the data portion of an ongoing transmission.

In another embodiment, the eNB schedules a UE using multiple subcarriers to overlap with UEs using single subcarrier.

In yet another embodiment, the eNB schedules single/multiple UEs via NOMA on the same subcarriers which overlap with the data portion of an ongoing transmission (for example, scheduling one or more UEs using IDMA).

At the eNB, packets from $UE_2$, $UE_3$, $UE_5$ in the above example (see FIG. 4) are decoded normally. For $UE_1$ and $UE_4$, eNB can do one of the following:

(1) Perform successive interference cancellation by reconstructing the interfering signals and then canceling them out. For example, for $UE_1$, eNB will reconstruct NPUSCH signals from $UE_2$, $UE_3$, and $UE_5$ and then cancel them out.

(2) Use log-likelihood ratio (LLR) erasures for portions that have high interference. In one example, the eNB sets the LLR values in the overlapped symbols to zero. In another example, the eNB can detect LLR outliers and perform erasures, namely, it can erase LLRs that exceed a certain level of confidence in relation to the average and standard deviation by setting them to zero. This effectively reduces the number of repetitions being accumulated, but will not meaningfully affect performance due to the safety margin and large step size of the repetition factor.

(3) The eNB can try first to decode the packet using the erasure method first and, if unsuccessful, perform successive interference cancellation.

(4) NOMA type of decoding (such as IDMA) can be performed for $UE_1$ and $UE_4$ when these UEs are using NOMA (such as PD-NOMA or IDMA, etc.) for transmission.

By using the method of this invention, the eNB can schedule a UE in good condition using all 12 subcarriers even when there are ongoing transmissions by UEs using single subcarriers. Use of this method will increase the instantaneous throughput of the good UE significantly.

Figure 5A:
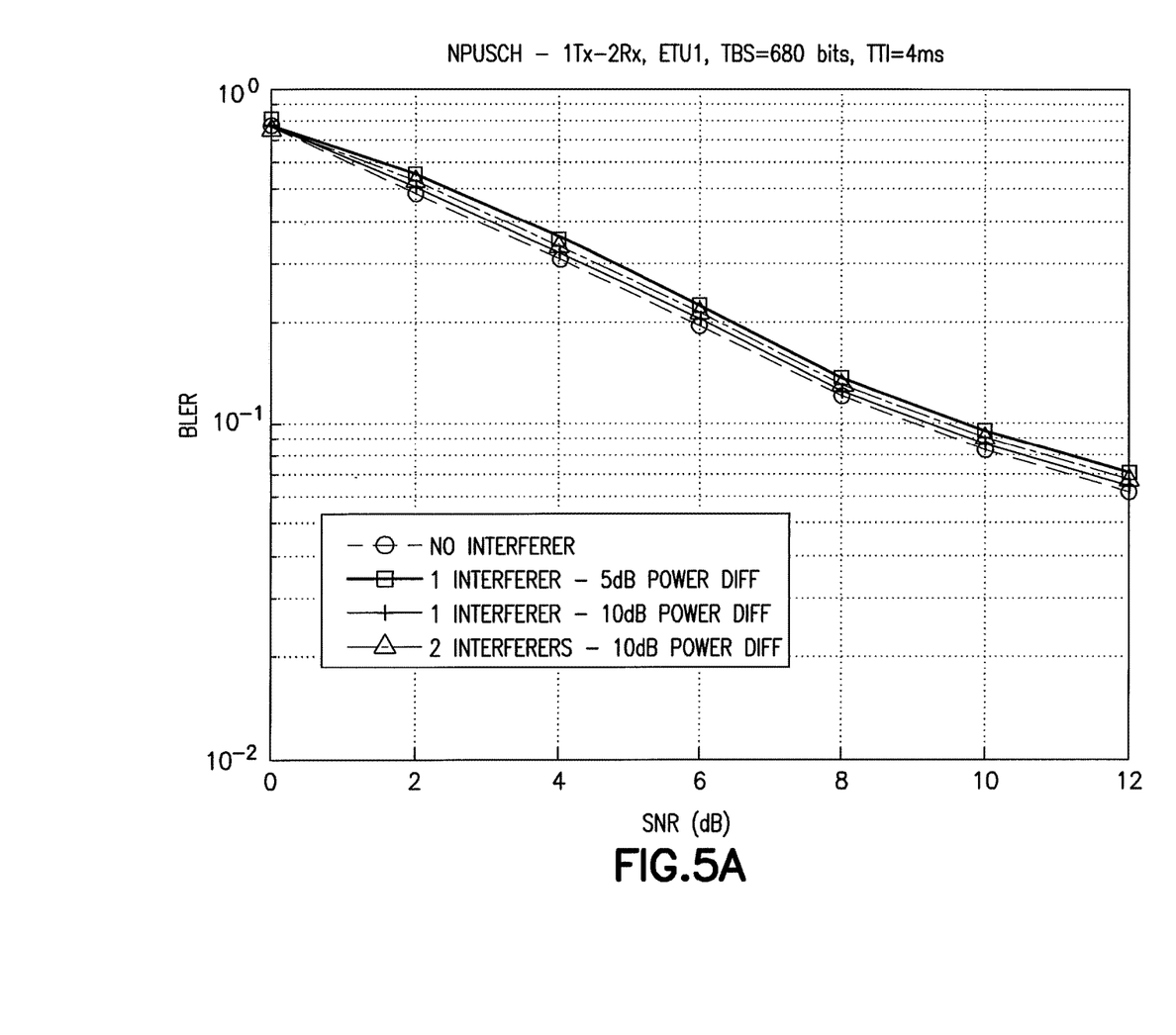
FIG. 5A is a graph representing NPUSCH performance for UE in good condition with overlapped UE(s) where 12 subcarriers, 4 RUs, and TBS=680 bits.
Figure 5B:
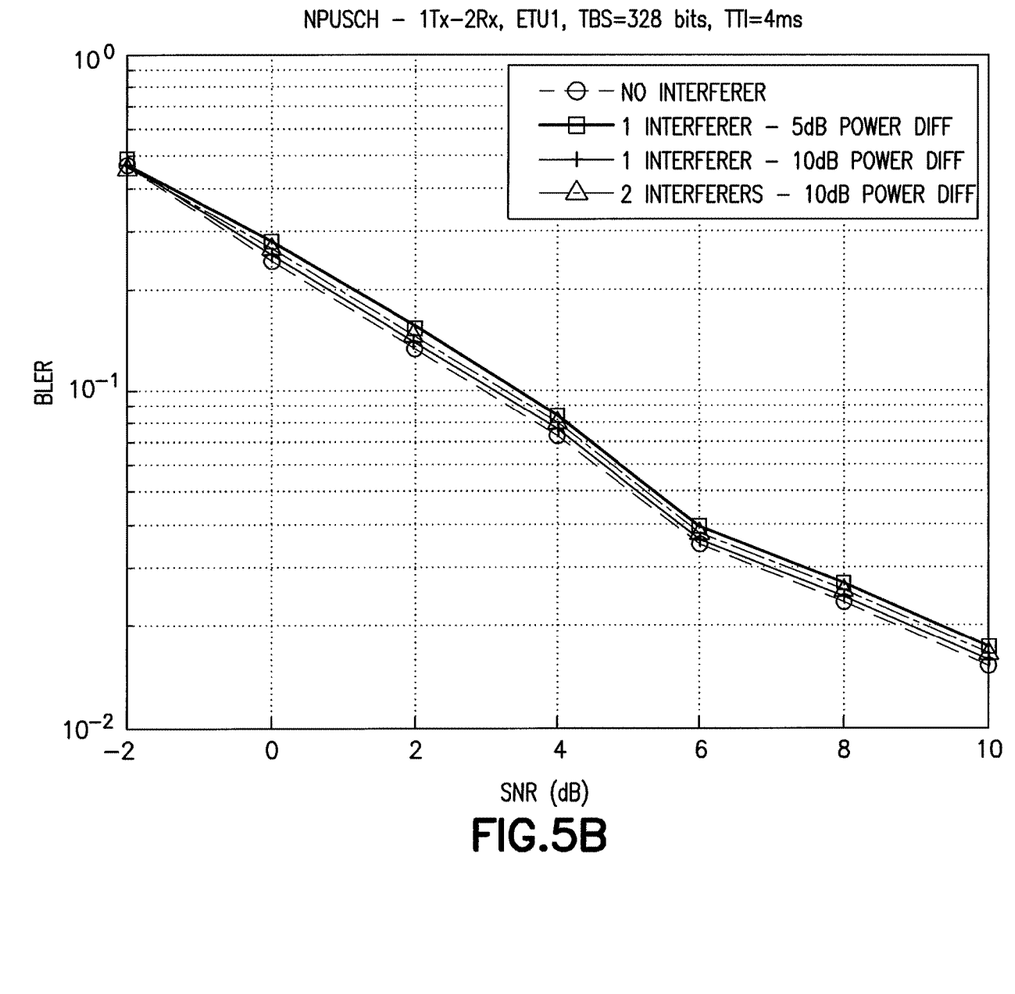
FIG. 5B is a graph representing NPUSCH performance for UE in good condition with overlapped UE(s) where 12 subcarriers, 4 RUs, and TBS=328 bits.

FIG. 5 shows the NPUSCH performance of a UE in good condition that has been scheduled to overlap with UE(s) in bad condition (i.e. received power difference of either 5 or 10 dB) for two different MCS levels. From the figure, it is seen that there is only a slight degradation in performance due to the interference from poor UE(s). This is true even when the overlap is with 2 interferers.

Figure 6:
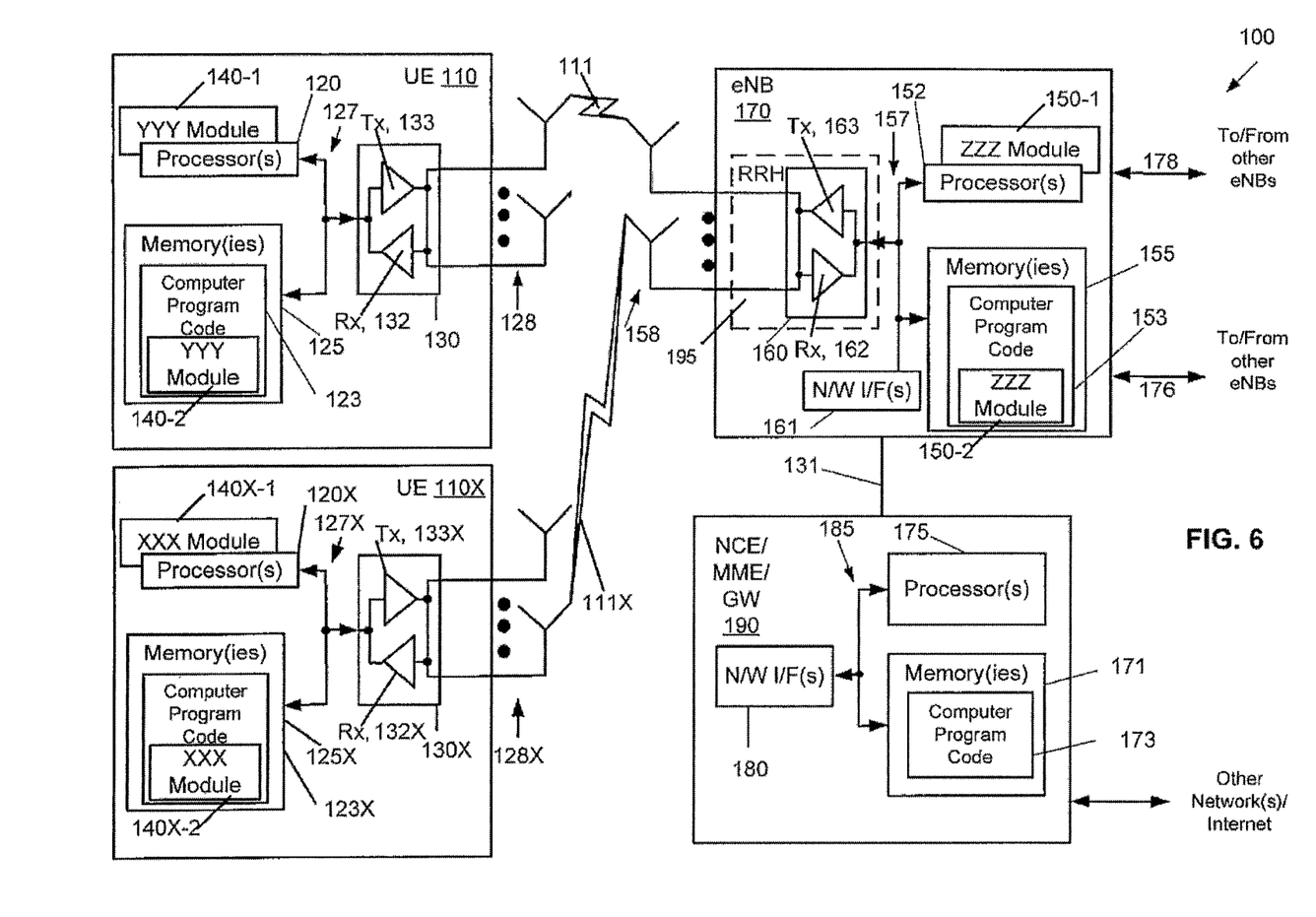
FIG. 6 is a block diagram of an exemplary system in which the exemplary embodiments may be practiced.

FIG. 6 shows a block diagram of a system in which the examples of embodiments of the invention may be practiced.

The eNB 170 is a base station that provides access for wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a ZZZ module 150, comprising one of or both parts 150-1 and/or 150-2, which may be implemented in a number of ways. The methods discussed herein are assumed to be performed by the respective modules.

The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

Turning to user equipment in FIG. 6, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. If UE 110 does communicate with eNB 170, then it does so via wireless link 111.

The wireless network 100 may include a network control element (NCE) 190 that may include MME/SGW functionality, and which provides connectivity with a further network, such as a telephone network and/or a data communications network (e.g., the Internet). The eNB 170 and other eNBs are coupled via links 131 to the NCE 190. The links 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Turning to the other user equipment in FIG. 6, a $UE_k$ 110X is in wireless communication with a wireless network 100. This other user equipment 110X includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The $UE_k$ 110X includes a XXX module 140X, comprising one of or both parts 140X-1 and/or 140X-2, which may be implemented in a number of ways. The XXX module 140X may be implemented in hardware as XXX module 140X-1, such as being implemented as part of the one or more processors 120X. The XXX module 140X-1 may be implemented also as an integrated circuit or through other hardware such as a programmable gate array. In another example, the XXX module 140X may be implemented as XXX module 140X-2, which is implemented as computer program code 123X and is executed by the one or more processors 120X. For instance, the one or more memories 125X and the computer program code 123X may be configured to, with the one or more processors 120X, cause the user equipment 110X to perform one or more of the operations as described herein. The $UE_k$ 110X communicates with eNB 170 via a wireless link 111X.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors 152 and 175 and memories 155 and 171.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 and other user equipment 110X can include, but are not limited to the low complexity devices, low-throughput, low-cost, and long battery life devices discussed earlier herein but may also include cellular telephones such as smart phones, personal digital assistants (PDAs) having wireless communication capabilities, portable computers having wireless communication capabilities, image capture devices such as digital cameras having wireless communication capabilities, gaining devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., memories 125, 125X, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

Figure 7:
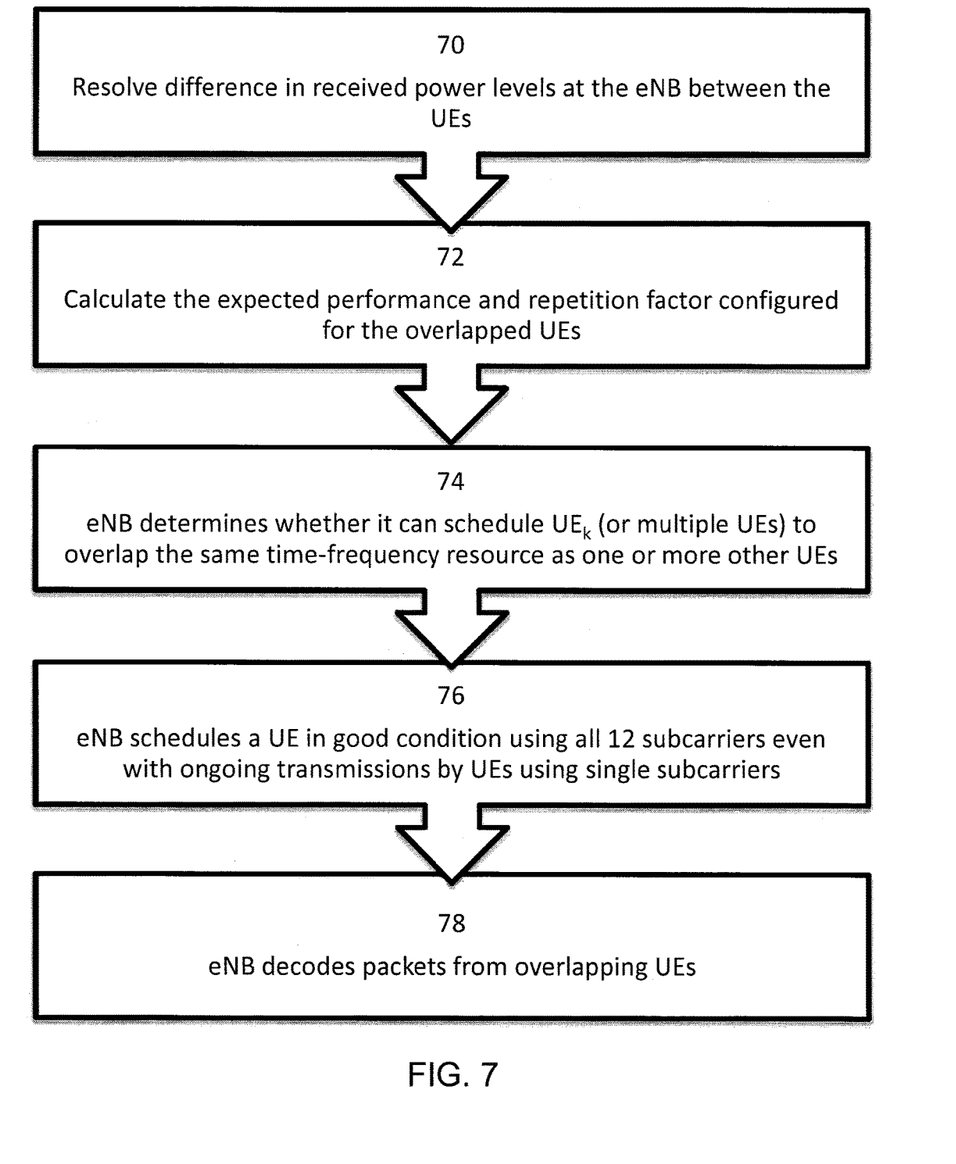
FIG. 7 is a logic flow diagram for the operation of an exemplary method, a result of execution of computer program instructions embodied on a computer readable memory, functions performed by logic implemented in hardware, and/or interconnected means for performing functions in accordance with exemplary embodiments.

The apparatus such as an eNB 170 can provide functionality to the operations described herein below. FIG. 7 is a block diagram of an example of a logic flow diagram that illustrates the operation of an example of a method, a result of execution of computer program instructions embodied on a computer readable memory, and/or functions performed by logic implemented in hardware, in accordance with exemplary embodiments herein. The blocks in the figure may be considered to be means for performing the function in the blocks. Furthermore, each block in FIG. 7 may be implemented as a module, such as a circuit or other hardware, for performing the function in the block. The blocks in FIG. 7 may be an example of an implementation of the ZZZ module in FIG. 6. Thus, in FIG. 6, eNB 170, e.g., under control of the ZZZ module, performs the appropriate blocks in FIG. 7. The eNB 170 or ZZZ module of FIG. 6 could also be thought of as the means for performing the steps of the method or any aspects of the methods described herein or as illustrated in FIG. 7. Similarly, the YYY module may also be means of performing aspects of the method described herein. Additionally, the XXX module may also be means of performing aspects of the method described herein.

FIG. 7 is a logic flow diagram for actions performed in eNB for illustrating the operation of an exemplary method, a result of execution of computer program instructions embodied on a computer readable memory, functions performed by logic implemented in hardware, and/or interconnected means for performing functions in accordance with exemplary embodiments. For instance, the ZZZ module 150 may include multiples ones of the blocks in FIG. 7, where each included block is an interconnected means for performing the function in the block. The blocks in FIG. 7 are assumed to be performed by the eNB 170, e.g., under control of the ZZZ module 150 at least in part.

Block 70 represents the eNB resolving the difference in received power levels between the UEs.

In block 72, the eNB calculates the expected performance and repetition factor configured for the overlapped UEs.

The eNB determines whether it can schedule $UE_k$ (or multiple UEs), represented in block 74, to overlap the same time-frequency resource as one or more other UEs.

In block 76, the eNB schedules a UE in good condition using all 12 subcarriers even with ongoing transmissions by UEs using single subcarrier.

After the eNB schedules UE transmission, block 78 represents the eNB decoding packets from overlapping UEs.

Without in any way limiting the scope, interpretation, or application of the claims appearing below, a technical effect or advantage of one or more of the example embodiments disclosed is that it increases the capacity of a wide-area wireless network used for serving IoT UEs by allowing such UEs to share radio resources through exploiting inherent differences in received signal characteristics of the different UEs.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

An example of an embodiment, which can be referred to as item 1, is a method that comprises receiving an indication of power levels at the base station in a wireless communications system from each UE of one or more UEs served by the base station; determining whether at least one UE of one or more UEs is capable to overlap at least one same time-frequency resource as at least one UE of a remainder of one or more UEs; in response to the determining permitting the overlap by at least one UE capable to overlap with at least one UE of the remainder, scheduling the overlap; based on the scheduling overlap, receiving packets from the one or more UEs served by the base station; and decoding the packets from the one or more UEs using an advanced receiver process.

An example of a further embodiment, which can be referred to as item 2, is the method of item 1 where the indication comprises a report of corresponding downlink RSRP/RSRQ measurements of each UE.

An example of a further embodiment, which can be referred to as item 3, is the method of items 1 or 2, wherein evaluating the mode state comprises an indication of the energy supply of the drone.

An example of a further embodiment, which can be referred to as item 4, is the method of items 1 to 3 where the determining comprises measuring differences in the received power levels between the one or more UEs; and calculating an expected performance and repetition factor for an overlapped remainder of the one or more UEs.

An example of a further embodiment, which can be referred to as item 5, is the method of items 1 to 4 where the scheduling further comprises that the difference in the received power levels to overlap with an ongoing transmission meets or exceeds a threshold.

An example of a further embodiment, which can be referred to as item 6, is the method of items 1 to 5, where the ratio between the repetition factor selected by the at least one UE of the remainder and the repetition factor determined by the eNB as needed for that UE exceeds a threshold.

An example of a further embodiment, which can be referred to as item 7, is the method of items 1 to 6, where the scheduling further comprises scheduling a first UE to overlap a second UE of the one or more UEs when the signal-to-interference-plus noise ratio (SINR) is estimated to be degraded due to mutual interference by no more than a first threshold for the first UE and/or a second threshold for the second UE, where the first threshold and the second threshold are determined by the eNB based on UE coverage level, number of repetitions, modulation and coding scheme (MCS), power level, or other parameters.

An example of a further embodiment, which can be referred to as item 8, is the method of items 1 to 6, where scheduling further comprises only a data portion of an ongoing transmission can overlap.

An example of a further embodiment, which can be referred to as item 9, is the method of items 1 to 6, where scheduling further comprises the one or more UEs use multiple subcarriers to overlap with one or more UEs using single subcarrier.

An example of a further embodiment, which can be referred to as item 10, is the method of items 1 to 6, where scheduling comprises one or more UEs via NOMA being on same subcarriers overlapping with a data portion of an ongoing transmission.

An example of a further embodiment, which can be referred to as item 11, is the method of items 1 to 10, where the advanced receiver process comprises decoding packets from the at least one UE capable to overlap by a standardly used process; and decoding packets from the at least one UE of the remainder by performing successive interference cancellation by reconstructing the signals from the at least one UE capable of overlap and then cancelling out the reconstructed signals in the at least one overlapped resource.

An example of a further embodiment, which can be referred to as item 12, is the method of items 1 to 10, where the advanced receiver process comprises decoding packets from the at least one UE capable to overlap by a standardly used process; and decoding packets from the at least one UE of the remainder by using a log-likelihood ratio (LLR) value that exceeds a threshold and, based thereon, erasing interfering signals of the at least one overlapped resource.

An example of a further embodiment, which can be referred to as item 13, is the method of items 1 to 10, where, if unsuccessful, then decoding packets from the at least one UE of the remainder by using a log-likelihood ratio (LLR) value that exceeds a threshold and, based thereon, erasing interfering signals of the at least one overlapped resource.

An example of a further embodiment, which can be referred to as item 14, is the method of items 1 to 10, where the advanced receiver process comprises performing NOMA type of decoding for UEs of the at least one UE of the remainder using NOMA.

An example of a further embodiment, which can be referred to as item 15, is the method of items 1 to 14, where the wireless communication system comprises a low-power wide area network for the Internet of Things.

An example of a further embodiment, which can be referred to as item 16, is the method of items 1 to 15, where the base station is an eNB, the UEs are IoT devices, or both.

An example of another embodiment of the present invention, which can be referred to as item 17, is an apparatus comprising at least one processor; and at least one memory including computer program code, the at least one memory and the computer program code configured to, with the at least one processor, cause the apparatus to perform at least the following receiving an indication of power levels in a wireless communications system from each UE of one or more UEs served by the base station; determining whether at least one UE of one or more UEs is capable to overlap at least one same time-frequency resource as at least one UE of a remainder of one or more UEs; in response to the determining permitting the overlap by at least one UE capable to overlap with at least one UE of the remainder, scheduling the overlap; based on the scheduling overlap, receiving packets from the one or more UEs served by the apparatus; and decoding the packets from the one or more UEs using an advanced receiver process.

An example of a further embodiment, which can be referred to as item 18, is the apparatus of item 17, where the indication comprises a report of corresponding downlink RSRP/RSRQ measurements of each UE.

An example of a further embodiment, which can be referred to as item 19, is the apparatus of items 17 or 18, where the indication comprises coverage level of each UE.

An example of a further embodiment, which can be referred to as item 20, is the apparatus of items 17 to 19, where the determining comprises measuring differences in the received power levels between the one or more UEs; and calculating an expected performance and repetition factor for an overlapped remainder of the one or more UEs.

An example of a further embodiment, which can be referred to as item 21, is the apparatus of items 17 to 20, where the scheduling further comprises that the difference in the received power levels to overlap with an ongoing transmission meets or exceeds a threshold.

An example of a further embodiment, which can be referred to as item 22, is the apparatus of items 17 to 21, where the ratio between the repetition factor selected by the at least one UE of the remainder and the repetition factor determined by the eNB as needed for that UE exceeds a threshold.

An example of a further embodiment, which can be referred to as item 23, is the apparatus of items 17 to 22, where the scheduling further comprises scheduling a first UE to overlap a second UE of the one or more UEs when the signal-to-interference-plus noise ratio (SINR) is estimated to be degraded due to mutual interference by no more than a first threshold for the first UE and/or a second threshold for the second UE, where the first threshold and the second threshold are determined by the eNB based on UE coverage level, number of repetitions, modulation and coding scheme (MCS), power level, or other parameters.

An example of a further embodiment, which can be referred to as item 24, is the apparatus of items 17 to 22, where scheduling further comprises only a data portion of an ongoing transmission can overlap.

An example of a further embodiment, which can be referred to as item 25, is the apparatus of items 17 to 22, where scheduling further comprises the one or more UEs use multiple subcarriers to overlap with one or more UEs using single subcarrier.

An example of a further embodiment, which can be referred to as item 26, is the apparatus of items 17 to 22, where scheduling comprises one or more UEs via NOMA being on same subcarriers overlapping with a data portion of an ongoing transmission.

An example of a further embodiment, which can be referred to as item 27, is the apparatus of items 17 to 26, where the advanced receiver process comprises decoding packets from the at least one UE capable to overlap by a standardly used process; and decoding packets from the at least one UE of the remainder by performing successive interference cancellation by reconstructing the signals from the at least one UE capable of overlap and then cancelling out the reconstructed signals in the at least one overlapped resource.

An example of a further embodiment, which can be referred to as item 28, is the apparatus of items 17 to 26, where the advanced receiver process comprises decoding packets from the at least one UE capable to overlap by a standardly used process; and decoding packets from the at least one UE of the remainder by using a log-likelihood ratio (LLR) value that exceeds a threshold and, based thereon, erasing interfering signals of the at least one overlapped resource.

An example of a further embodiment, which can be referred to as item 29, is the apparatus of item 27, where, if unsuccessful, then decoding packets from the at least one UE of the remainder by using a log-likelihood ratio (LLR) value that exceeds a threshold and, based thereon, erasing interfering signals of the at least one overlapped resource.

An example of a further embodiment, which can be referred to as item 30, is the apparatus of items 17 to 26, where the advanced receiver process comprises performing NOMA type of decoding for UEs of the at least one UE of the remainder using NOMA.

An example of a further embodiment, which can be referred to as item 31, is the apparatus of items 17 to 30, where the wireless communication system comprises a low-power wide area network for the Internet of Things.

An example of a further embodiment, which can be referred to as item 32, is the apparatus of items 17 to 31, where the apparatus is an eNB, the UEs are IoT devices, or both.

In another example of an embodiment of the current invention, which can be referred to item 33, is a computer program product including a program for a processing device, comprising software code portions for performing the steps of any one of claims 1 to 16 when the program is run on the processing device.

In another example of an embodiment of the current invention, which can be referred to item 34, is the computer program product according to item 33, where the computer program product comprises a computer-readable medium on which the software code portions are stored.

In another example of an embodiment of the current invention, which can be referred to item 35, is the computer program product according to item 33, where the program is directly loadable into an internal memory of the processing device.

In another example of an embodiment of the current invention, which can be referred to item 36, is a computer program product comprising a non-transitory computer-readable medium bearing computer program code embodied therein for use with a computer, the computer program code comprising code for performing when executed the method of any one of claims 1 to 16.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:
1. A method comprising:
receiving an indication of power levels at a base station in a wireless communications system from each user equipment of one or more user equipments served by the base station;
determining whether at least one user equipment of the one or more user equipments is capable to overlap at least one same time-frequency resource as at least one user equipment of a remainder of the one or more user equipments, wherein the determining is based at least partially upon the indication of power levels at the base station from the at least one user equipment of the one or more user equipments meeting or exceeding the indication of power levels at the base station from the at least one user equipment of the remainder plus a threshold;
in response to the determining the at least one user equipment of the one or more user equipments is capable to overlap with the at least one user equipment of the remainder, scheduling the overlap;

based on the scheduled overlap, receiving packets from the one or more user equipments served by the base station; and decoding the packets from the one or more user equipments using an advanced receiver process.

2. The method of claim 1, wherein the indication comprises a report of corresponding downlink reference signal received power/reference signal received quality measurements of each user equipment.

3. The method of claim 1, wherein the indication comprises coverage level of each user equipment.

4. The method of claim 1, wherein the determining further comprises:

measuring differences in the received power levels between the one or more user equipments; and calculating an expected performance and repetition factor for an overlapped remainder of the one or more user equipments.

5. The method of claim 4, wherein the ratio between a repetition factor selected by the at least one user equipment of the remainder and the repetition factor determined by the base station as needed for that user equipment exceeds a threshold.

6. The method of claim 1, wherein the scheduling further comprises scheduling a first user equipment to overlap a second user equipment of the one or more user equipments when the signal-to-interference-plus noise ratio is estimated to be degraded due to mutual interference no more than a first threshold for the first user equipment and/or a second threshold for the second user equipment, wherein the first threshold and the second threshold are determined by the base station based on user equipment coverage level, number of repetitions, modulation and coding scheme, power level, or other parameters.

7. The method of claim 1, wherein scheduling further comprises only a data portion of an ongoing transmission can overlap.

8. The method of claim 1, wherein scheduling further comprises the one or more user equipments use multiple subcarriers to overlap with one or more user equipments using single subcarrier.

9. The method of claim 1, wherein scheduling comprises the one or more user equipments via non-orthogonal multiple access being on same subcarriers overlapping with a data portion of an ongoing transmission.

10. The method of claim 1, wherein the advanced receiver process comprises:

decoding packets from the at least one user equipment of the remainder, where the decoding comprises performing successive interference cancellation, where the successive interference cancellation comprises reconstructing the signals from the at least one user equipment capable of overlap and then cancelling out the reconstructed signals in the at least one overlapped resource.

11. The method of claim 10, wherein, if unsuccessful, then decoding packets from the at least one user equipment of the remainder, where the decoding comprises using a log-likelihood ratio value that exceeds a threshold and, based thereon, erasing interfering signals of the at least one overlapped resource.

12. The method of claim 1, wherein the advanced receiver process comprises:

decoding packets from the at least one user equipment of the remainder, where decoding the packets comprises using a log-likelihood ratio value that exceeds a threshold and, based thereon, erasing interfering signals of the at least one overlapped resource.

13. The method of claim 1, wherein the advanced receiver process comprises:

decoding apackets from the at least one user equipment of the remainder, where decoding the packets comprises using non-orthogonal multiple access type of decoding.

14. The method of claim 1, wherein the wireless communication system comprises a low-power wide area network for the Internet of Things.

15. The method of claim 1, wherein the base station is an eNB, the user equipments are Internet of Things devices, or both.

16. An apparatus comprising:

at least one processor; and at least one non-transitory memory including computer program code, the at least one non-transitory memory and the computer program code configured to, with the at least one processor, cause the apparatus to perform at least the following:

receiving an indication of power levels in a wireless communications system from each user equipment of one or more user equipments served by the apparatus;

determining whether at least one user equipment of the one or more user equipments is capable to overlap at least one same time-frequency resource as at least one user equipment of a remainder of the one or more user equipments, wherein the determining is based at least partially upon the indication of power levels at the apparatus from the at least one user equipment of the one or more user equipments meeting or exceeding the indication of power levels at the apparatus from the at least one user equipment of the remainder of one or more user equipments plus a threshold;

in response to the determining the at least one user equipment of one or more user equipments is capable to overlap with the at least one user equipment of the remainder, scheduling the overlap;

based on the scheduled overlap, receiving packets from the one or more user equipments served by the apparatus; and decoding the packets from the one or more user equipments using an advanced receiver process.

17. The apparatus according to claim 16, wherein the scheduling further comprises scheduling a first user equipment to overlap a second user equipment of the one or more user equipments when the signal-to-interference-plus noise ratio is estimated to be degraded due to mutual interference no more than a first threshold for the first user equipment and/or a second threshold for the second user equipment, wherein the first threshold and the second threshold are determined by the apparatus based on user equipment coverage level, number of repetitions, modulation and coding scheme, power level, or other parameters.

18. The apparatus according to claim 16, wherein the advanced receiver process comprises:

decoding packets from the at least one user equipment of the remainder, where decoding the packets comprises using a log-likelihood ratio value that exceeds a threshold and, based thereon, erasing interfering signals of the at least one overlapped resource.

19. A computer program product comprising a non-transitory computer-readable medium bearing computer program code embodied therein for use with a computer, the computer program code comprising code for performing when executed at least the following:

receiving an indication of power levels at a base station in a wireless communications system from each user equipment of one or more user equipments served by the base station;

determining whether at least one user equipment of the one or more user equipments is capable to overlap at least one same time-frequency resource as at least one user equipment of a remainder of the one or more user equipments, wherein the determining is based at least partially upon the indication of power levels at the base station from the at least one user equipment of the one or more user equipments meeting or exceeding the indication of power levels at the base station from the at least one user equipment of the remainder plus a threshold;

in response to the determining the at least one user equipment of the one or more user equipments is capable to overlap with the at least one user equipment of the remainder, scheduling the overlap;

based on the scheduled overlap, receiving packets from the one or more user equipments served by the base station; and decoding the packets from the one or more user equipments using an advanced receiver process.

20. The computer program product according to claim 19, wherein the scheduling further comprises scheduling a first user equipment to overlap a second user equipment of the one or more user equipments when the signal-to-interference-plus noise ratio is estimated to be degraded due to mutual interference no more than a first threshold for the first user equipment and/or a second threshold for the second user equipment, wherein the first threshold and the second threshold are determined by the base station based on user equipment coverage level, number of repetitions, modulation and coding scheme, power level, or other parameters.

* * * * *

UNITED STATES PATENT AND TRADEMARK OFFICE
CERTIFICATE OF CORRECTION

PATENT NO. : 10,425,853 B2
APPLICATION NO. : 15/444869
DATED : September 24, 2019
INVENTOR(S) : Rapeepat Ratasuk et al.

It is certified that error appears in the above-identified patent and that said Letters Patent is hereby corrected as shown below:

In the Claims

In Claim 13:
Column 16, Line 5, "apackets" should be deleted and --packets-- should be inserted.

Signed and Sealed this
Twenty-sixth Day of November, 2019

Andrei Iancu
*Director of the United States Patent and Trademark Office*